(12) United States Patent
Vanderzon

(10) Patent No.: US 7,271,550 B2
(45) Date of Patent: Sep. 18, 2007

(54) DIMMER CIRCUIT ARRANGEMENT

(75) Inventor: James Robert Vanderzon, Bowden (AU)

(73) Assignee: Clipsal Integrated Systems Pty Ltd, Bowden, South Australia (AU)

(*) Notice: Subject to any disclaimer, the term of this patent is extended or adjusted under 35 U.S.C. 154(b) by 12 days.

(21) Appl. No.: 10/508,589

(22) PCT Filed: Mar. 25, 2003

(86) PCT No.: PCT/AU03/00365

§ 371 (c)(1),
(2), (4) Date: Mar. 18, 2005

(87) PCT Pub. No.: WO03/081961

PCT Pub. Date: Oct. 2, 2003

(65) Prior Publication Data

US 2005/0174070 A1    Aug. 11, 2005

(30) Foreign Application Priority Data

Mar. 25, 2002  (AU) .................................. PS1312

(51) Int. Cl.
    *G05F 1/00*    (2006.01)
(52) U.S. Cl. .................. 315/291; 315/216; 315/195; 315/307; 315/DIG. 4; 323/237; 323/265

(58) Field of Classification Search ................ 315/194, 315/195, 198, 199, 200 R, 216, 291, 297, 315/307, DIG. 4; 323/237, 271, 223, 265
See application file for complete search history.

(56) References Cited

U.S. PATENT DOCUMENTS

| 4,633,161 | A | * | 12/1986 | Callahan et al. ............ 323/242 |
| 4,797,599 | A | * | 1/1989 | Ference et al. ............. 315/194 |
| 4,823,069 | A | * | 4/1989 | Callahan et al. ............ 323/235 |
| 5,323,088 | A | | 6/1994 | Cunningham ............... 315/195 |
| 6,211,627 | B1 | * | 4/2001 | Callahan ..................... 315/294 |

FOREIGN PATENT DOCUMENTS

| GB | 2 297 441 A | 7/1996 |
| GB | 2 343 796 A | 5/2000 |
| NZ | 330486 | 5/1998 |

* cited by examiner

*Primary Examiner*—Haissa Philogene
(74) *Attorney, Agent, or Firm*—Klauber & Jackson LLC

(57) ABSTRACT

A dimmer circuit arrangement is disclosed including a second control circuit (40) for controlling the operation of a triac (50) for delivering current to a load (60), and a first control circuit (10) for controlling the operation of an IGBT power semiconductor switch (20) for controlling the rate of rise of load voltage. The first control circuit also controls the operation of the second control circuit.

13 Claims, 5 Drawing Sheets

DIMMER CIRCUIT ARRANGEMENT

CROSS REFERENCE TO RELATED APPLICATIONS

The present application is a National Stage Application claiming the priority of PCT Application No. PCT/AU03/00365 filed Mar. 25, 2003, which in turn, claims priority from Australian Provisional Patent Application No. PS 1312, filed Mar. 25, 2002. Applicants claim the benefits of 35 U.S.C. § 120 as to the PCT application and priority under 35 U.S.C. § 119 as to the said Australian application, and the entire disclosures of both applications are incorporated herein by reference in their entireties.

TECHNICAL FIELD

This invention relates to circuit arrangements for controlling the power provided to a load and in particular, to dimmer circuits for controlling, for example, the luminosity of a light or the speed of a fan.

BACKGROUND TO THE INVENTION

Dimmer circuits are used to control the power provided to a load such as a light or electric motor from a power source such as mains. Such circuits often use a technique referred to as phase controlled dimming. This allows power provided to the load to be controlled by varying the amount of time that a switch connecting the load to the power source is conducting during a given cycle.

For example, if voltage provided by the power source can be represented by a sine wave, then maximum power is provided to the load if the switch connecting the load to the power source is on at all times. In this way the, the total energy of the power source is transferred to the load. If the switch is turned off for a portion of each cycle (both positive and negative), then a proportional amount of the sine wave is effectively isolated from the load, thus reducing the average energy provided to the load. For example, if the switch is turned on and off half way through each cycle, then only half of the power will be transferred to the load. Because these types of circuits are often used with resistive loads and not inductive loads, the effect of repeatedly switching on and off power will not be noticeable as the resistive load has an inherent inertia to it. The overall effect will be, for example in the case of a light, a smooth dimming action resulting in the control of the luminosity of the light. This technique will be well understood by the person skilled in the art.

Such circuits usually consist of two parts, the first being a part to control the rate of rise of load voltage at each main half cycle. The second part is used to control the load current provided to the load via the use of a control switch. Various means are used to synchronise the action between these two parts, some more complex tan others. Traditionally, the synchronisation is achieved by a central control block which senses various parameters of the first part, determines when the second part should come into action and then upon such determination, provides control signals to the second part to control the switch. This circuit configuration is somewhat complex, both in design and implementation.

In devices that are mass produced, simplicity of design can lead to significant savings in cost during manufacture and an increased reliability in the function of the final product.

Similar considerations to each part of the circuit also apply and any simplification to any of the circuit blocks can lead to similar benefits.

Accordingly, it is an object of the present invention to provide a dimmer circuit arrangement which results in a simplified design.

SUMMARY OF THE INVENTION

According to the present invention, there is provided a dimmer circuit for controlling the delivery of power to a load, the dimmer circuit including: a first control circuit for controlling a first switch for controlling a rate of rise of voltage across the load; and a second control circuit for controlling a second switch; wherein said second control circuit is controlled by said first control circuit.

Preferably, the first switch and the second switch are separated by a rectifying circuit.

Preferably, the second control circuit is controlled by said first control circuit via the rectifying circuit.

Preferably, the second control circuit obtains control signals from the first control circuit by sensing a voltage across said rectifying circuit.

Preferably, the second control circuit is actuated upon sensing that said voltage falls below a pre-set voltage threshold.

Preferably, said pre-set voltage threshold is determined by a zener diode.

Preferably, the pre-set voltage threshold is set to exceed a conduction voltage level of said first switch.

Alternatively, the second control circuit obtains control signals from the first control circuit by sensing a current through the rectifying circuit.

Preferably, the second control circuit is actuated upon sensing that the current rises above a pre-set current threshold.

Preferably, the first switch is an IGBT power semiconductor.

Preferably, the second switch is a triac.

Preferably, the second control circuit controls the second switch to control the load current provided to the load.

Preferably, the dimmer circuit is a leading edge phase control dimmer circuit.

DETAILED DESCRIPTION OF THE PREFERRED EMBODIMENT

Figure 1:
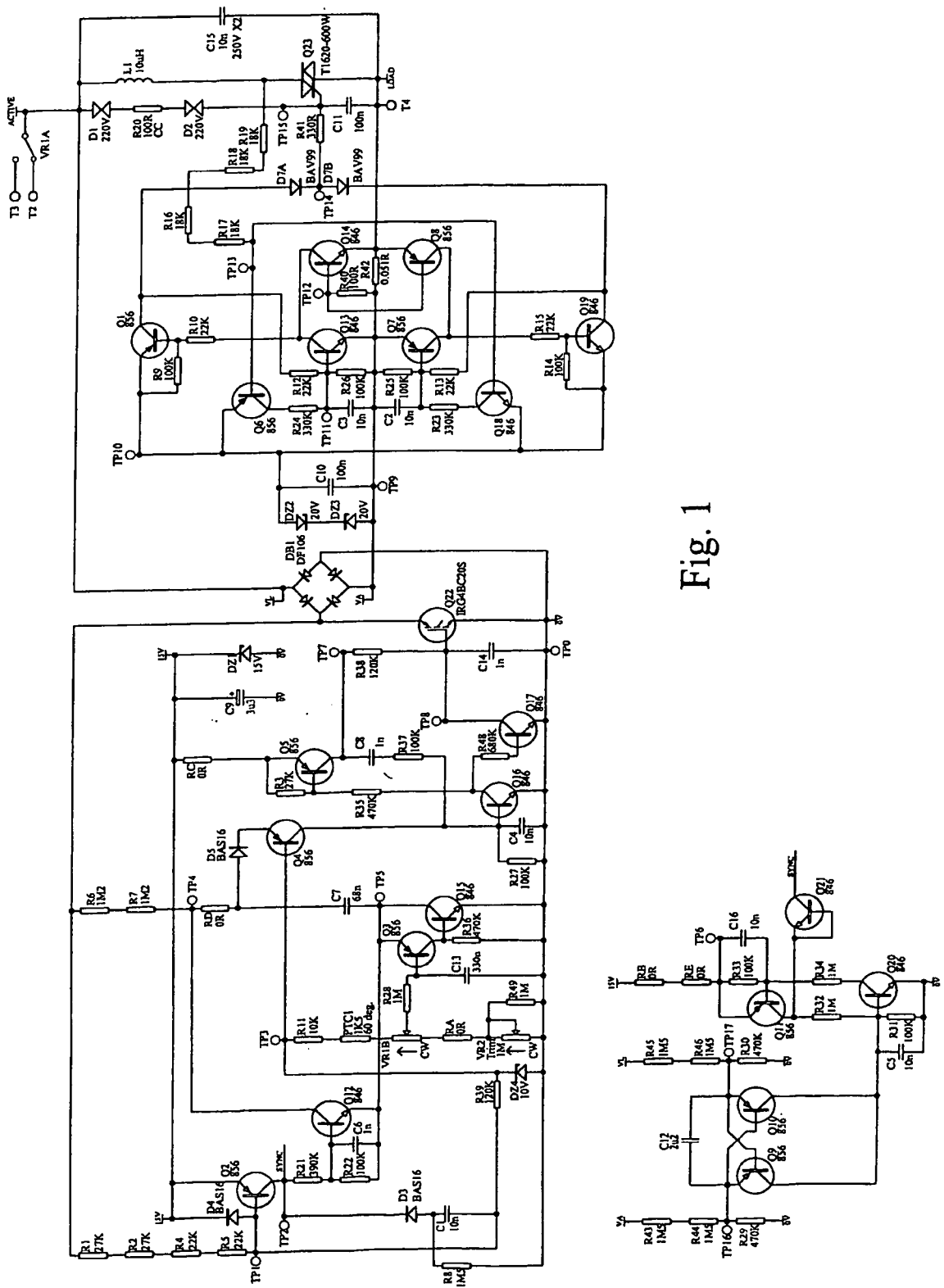
FIG. 1 shows a first embodiment of the dimmer circuit of the present invention.

A preferred circuit design of a 2-wire, leading edge phase control light dimmer/fan speed controller is shown in FIG. 1. The design shown in FIG. 1 is particularly effective in that it is electromagnetic compatible (EMI compliant). This refers to the amount of electromagnetic interference (EMI) that is generated by the circuit. The amount of radiation generated by dimming circuits due to the high frequency switching of the circuit is heavily regulated and such circuits must not exceed the regulated level of EMI.

The circuit design of FIG. 1 controls the level of EMI generated by the circuit via active control of the rate of rise of load voltage at each main half cycle. A power semiconductor in the form of an IGBT is used for this function. The IGBT and associated drive control circuitry is connected to the DC side of a diode bridge to allow control of polarities of mains voltage.

A power triac is used to handle the load current once the IGBT has performed the required slow switching function. This reduces power dissipation to a minimum since it has an on-state voltage lower than that of the IGBT/bridge conduction voltage.

The IGBT circuit of FIG. 1 can be separated into the following blocks:
low voltage DC power rail
main voltage zero cross detector
power up drive inhibit
control timing
IGBT gate drive Power for the IGBT control circuit is derived from mains via the load, in each half cycle during the time period before IGBT operation commences, ie. while mains voltage appears across the dimmer. Overall current consumption is long enough to allow the use of a relatively low dissipation resistive chain provided by R1, R2, R4 and R5. A smoothing capacitor, C9 stores enough charge provided at the start of each half cycle to provide circuit current for the remaining period, with relatively low ripple voltage. Excess supply current is shunted by voltage regulating zener diode DZ1 with the resultant of nominal DC power rail of 15 volts. This arrangement provides the low voltage DC power rail block referred to above.

The mains voltage zero cross detector resets the control timing circuit (described in more detail below) in each half cycle after load current commences. Timing is allowed to start again when mains voltage reappears across the circuit in the following half cycle. For resistive loads this will correspond to mains voltage zero crossing. For inductive loads however, this corresponds to load current zero crossing, which occurs later than mains voltage zero crossing.

Transistor Q2 with its emitter connected to the DC rail, has its base driven by the power supply voltage dropping resistor chain described above. The collector pulls "sync" high whenever the voltage across the dimmer circuit is below the DC rail voltage. Conversely, when mains voltage exists across the dimmer circuit, transistor Q2 base emitter junction is reverse biased, preventing the collector from pulling up. During this time supply current is delivered to the DC rail via base-emitter shunting diode D4.

Reset of the controlled timing capacitor C7 is performed by discharge transistor Q12, which is driven by limiting resistor R21 from "sync" output of Q2. Transistor Q12 has base-emitter bypassed resistor R22 and capacitor C6 to reduce off-state leakage and to enhance EFT immunity.

The function of the power-up drive inhibit block is to inhibit the operation of the dimmer circuit for the first few main half cycles at power-up by temporarily by-passing the control timing capacitor C7 charging current. This is required to enable correct operation of the soft-start mechanism, which relies on an established DC voltage reference to function. A small capacitor C1, effectively connected to the DC rail, provides a current via diode D3 to drive discharge transistor Q12 during the period while the rail is rising at power-up. Blocking diode D3 isolates C1 from Q12 drive circuit once C1 has become completely charged after the power-up event. Resistor R8 thereafter serves to hold C1 in the fully charged state, in addition to providing a discharge path at power off.

The control timing block is used to provide the dimmer circuit with immunity to mains voltage ripple injection.

At the start of each mains half cycle, timing capacitor C7 charges via mains/load through current limiting resistors R6 and R7. A reference voltage determined by zener diode DZ4, sourced by resistor R39, is used as a charge threshold level for terminating the timing process. The voltage on the positive side of C7 must always reach a level of approximately two diode drops above this reference level, as determined by series connected diode D5 and transistor Q4, in order to initiate IGBT operation. At the pre-defined threshold voltage, the timing capacitor charging current is diverted to transistor Q4 in order to operate the IGBT drive control stage.

Adjustment of control firing angle is facilitated by a variable control voltage source connecting to the negative side of the timing capacitor. This control voltage is derived from zener diode DZ4 referenced voltage using main dimmer control potentiometer VR1. An RC filter made up of R28 and C13 provides a soft-start feature at power up due to the zero initial capacitor voltage condition. Buffering of the filtered control voltage is performed by cascaded transistors Q3 and Q15 to provide a low impedance source voltage. Resistor R36 bypasses the base-emitter of transistor Q15 to reduce leakage effects.

At the maximum control voltage (for maximum dimmer conduction angle), the required timing capacitor charging voltage is at its lowest. The minimum required timing capacitor charging voltage is equal to one forward voltage diode drop, as determined by diode D5, in addition to a small voltage across resistor R11. This level is independent of the absolute value of the zener diode DZ4 reference voltage. Consequently, the maximum conduction angle is inherently limited, being largely independent of component parameters, thus ensuring sufficient current is always available to supply the DC rail. Resistor R11 is included to further restrict the maximum dimmer conduction angle.

PTC1 is placed in series (on the reference voltage side) with VR1 to provide automatic reduction of conduction angle in the event of dimmer over-temperature due to over loading of the product. Trimpot VR2 is placed in series (circuit common side) with VR1 to allow adjustment of the minimum conduction angle, by raising the minimum control voltage.

The IGBT gate drive control circuit is provided by transistors Q16, Q17 and Q5. The circuit behaves as a non-retriggerable monostable and provides controlled gate drive current to the IGBT to achieve the desired slow switching outcome. Transistor Q5, connected to the DC rail, acts as a switch to source IGBT gate current via timing resistor R38 at turn on. Transistor Q17, connected to circuit common, acts as a switch for rapid discharge of IGBT gate charge at turn off.

Base drive current for input transistor Q16 is sourced by Q4 from the control timing circuit. The base-emitter is bypassed by resistor R27 and capacitor C4 to reduce off-state leakage and to enhance EFT immunity. When transistor Q16 is not driven, transistor Q17 is sufficiently biased via resistors R3, R13, R35 and R48, so that the collector holds the IGBT gate in the discharged (off) state. In this condition, transistor Q5 is not sufficiently biased to operate. When transistor Q16 is driven, resistor R35 provides sufficient bias to operate transistor Q5, which provides temporary regenerative base drive for transistor Q16 via RC network R37 and C8. This result in monostable action (approximately 300 micro seconds output duration). During this active condition, bias is removed from transistor Q17.

The combination of IGBT series gate current limiting resistor R38 and parallel gate capacitor gate C14 provides the required slow turn-on characteristic for EMC control at IGBT turn on. The values selected are specifically suited to the IGBT used, in this case IRG4 BC20S.

The triac control circuit is shown in FIG. 1 in the circuit block on the AC side of the diode bridge. The primary function of this circuit is to trigger the triac Q23 once the IGBT has completed the slow-switching EMC emission reduction operation, on a per half-cycle basis. An essentially symmetrical circuit is used to provide a triac gate drive pulse in quadrants 1 and 3 (gate drive polarity follows mains polarity).

Additional functions performed by the triac control circuit include over-current protection and dimmer over-voltage protection. Either of these conditions result in immediate triac triggering. During over-current conditions (for example incandescent inrush current), the triac shunts current away from the IGBT. During over-voltage conditions (for example mains transients), the triac shunting action transfers the transient potential to the load.

The triac control circuit derives its power from the mains via the load, in each half cycle during the time period before IGBT operation commences, that is while mains voltage appears across the dimmer. Average current consumption is long enough to allow the use of a relatively low dissipation resistive chain made up of R16, R17, R18 and R19. During each mains half-cycle, current provided by the resistor chain is used to charge the capacitor C10 to a voltage with polarity determined by the mains. The voltage developed across capacitor C10 is limited to approximately 20 volts for each polarity, as defined by shunting zener diodes DZ2 and DZ3. The sequence of operation of the drive circuit for each half cycle polarity is as follows:

reservoir capacitor C10 is charged while mains voltage is present.

A 100 micro second time delay circuit (R24 and C3) is initiated after the dimmer voltage falls below approximately 20 volts due to IGBT operation.

At the end of the time delay, the triac Q23 gate is supplied with current from capacitor C10 via limiting resistor R41.

In the positive mains half cycle, reservoir capacitor C10 is charged to approximately 20 volts from mains through limiting resistors R16, R17, R18 and R19 via the base-emitter junction of transistor Q18. When dimmer terminal voltage drops below the 20 volts at threshold, transistor Q6 provides charging current via current limiting resistor R24 for time-delay capacitor C3. When the voltage across capacitor C3 reaches approximately 0.6 volts, transistor Q13 operates, which in turn provides basic current drive for output transistor Q1 via current limiting resistor R10. Some regenerative feedback from the collector of transistor Q1 to the base of transistor Q13 via resistor R12 speeds up the switching action. The collector of transistor Q1 drives the triac gate via steering diode D7A and gate current limiting resistor R41. The function of diode D7A is to isolate the triac gate circuit during charging of reservoir capacitor C10 during the negative half mains half cycle. This is necessary because the base-collector junction of output transistor Q1 is forward biased in this period.

Capacitor C3 has the additional role of enhancing EFT immunity for transistor Q13, while resistor R76 reduces transistor leakage. Similarly, resistor R9 reduces leakage of output transistor Q1 which would consequently affect the C3 timing period.

The operation of the circuit for the negative mains half cycle is the same as described above but uses the mirrored set of components.

Applications utilising isolated PWM control for dimming level require that both the IGBT (Q22) and triac (Q23) together with associated drive circuitry is permanently connected to mains. This differs from the manually controlled two-wire modular dimmer application where a series mains interrupting switch is always used for load on/off control.

Generally in the dimmer circuit design, triac firing operation commences as the dimmer terminal voltage falls below a threshold level as a consequence of IGBT operation.

A modification to this method of operation is required for the isolated control interface dimmer which has permanent mains connection. In this case it is necessary to disable triac triggering which would otherwise be initiated near the end of every mains half cycle. Although the load is effectively in the off state, due to the very low prevailing triac conduction angle and hence load voltage, the resulting line conducted EMC emission levels would be quite large due to such triac operation.

To address this situation, additional circuitry has been incorporated which differentiates between the rate of change of mains voltage due to IGBT operation during dimming, and that due to normal mains voltage waveform when the IGBT is not activated via the isolated control interface.

In dimming operation, the triac drive circuit is normally disabled and is only enabled for a short period after detection of the relatively fast rate of change of load terminal voltage due to IGBT operation. During load off state conditions, the triac drive circuit is not enabled by the relatively slow rate of fall of mains voltage near the end of each half cycle.

Some important design considerations for this additional circuitry are that a high immunity to mains transients and mains ripple control signals is maintained.

Figure 2:
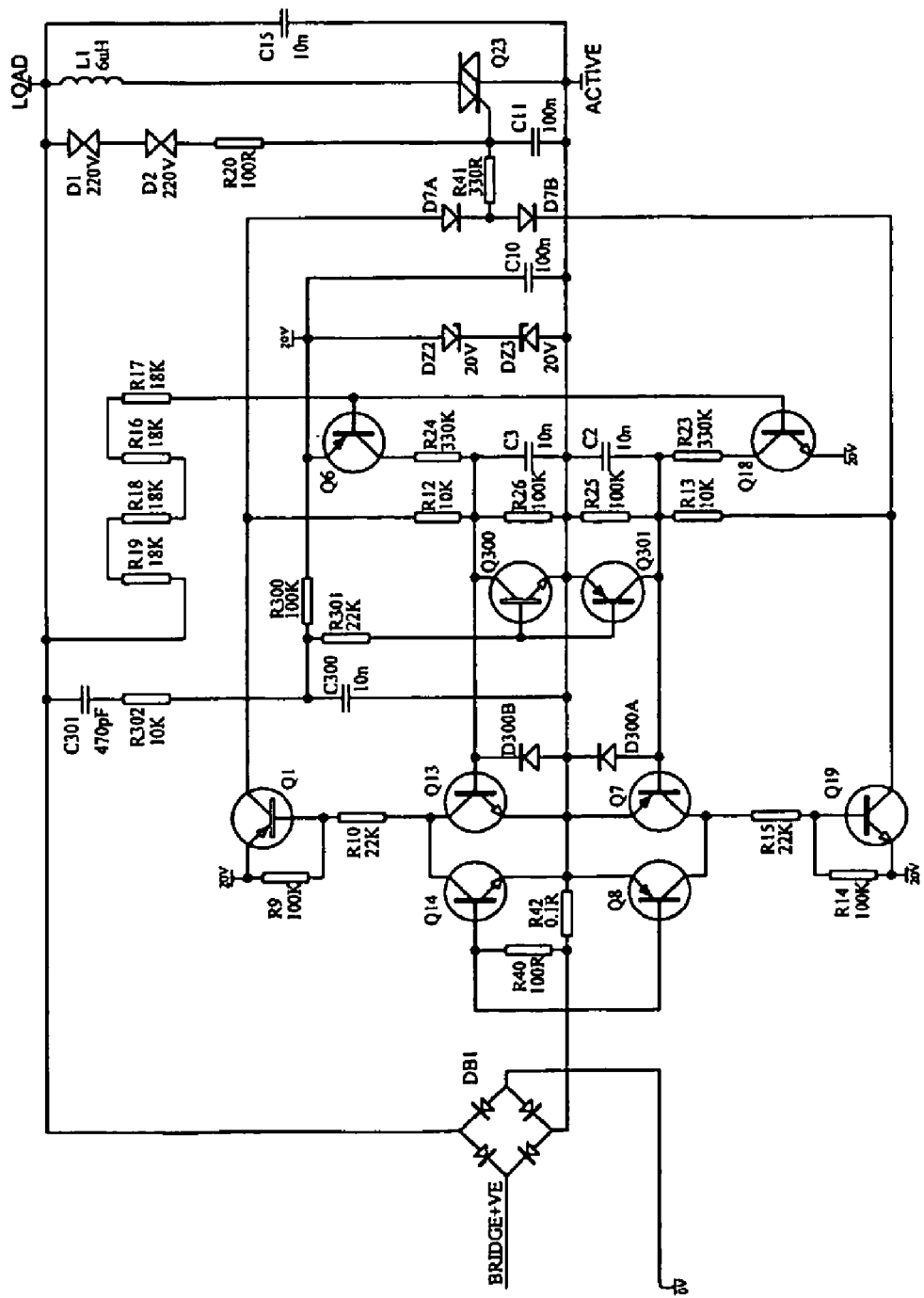
FIG. 2 shows an alternative arrangement of the triac control circuit portion of FIG. 1.

FIG. 2 shows a modified circuit of the triac control circuit of FIG. 1 as described above, in which common elements are identified accordingly.

A description of circuit operation with reference to FIG. 2 for one mains half-cycle polarity follows.

A clamping transistor, Q300 is used to disable the triac drive circuit from operating by shunting the charging current for the triac firing time delay capacitor, C3. A filter capacitor, C300 is normally charged from the ±20V rail via resistive divider elements, R300 & R301 with such polarity as to maintain the bias to the clamping transistor.

During IGBT, Q22 operation, the resulting bridge voltage dv/dt produces sufficient current through a small mains coupling capacitor, C301 to rapidly discharge the filter capacitor in order to reverse bias the damping transistor base-emitter junction. The clamping transistor remains biased off long enough to allow normal charging of the triac firing time delay capacitor, due to the filter capacitor/bias resistors time constant.

Immunity to mains ripple injection is achieved through the low-pass-filter action of the capacitor and bias resistors.

Without IGBT operation the relatively low dv/dt associated with the mains voltage waveform is insufficient to remove the bias voltage on the filter capacitor. Thus the clamping transistor continues to bypass charging of the triac firing delay capacitor, prevent possibility of triac operation.

A series resistor element, R302 for the mains coupling capacitor provides current limiting protection under mains surge/transient conditions.

A reverse connected diode, D300A is required across the collector-emitter junction of the clamping transistor, Q300 in order to prevent the transistor from interfering with correct operation of the associated transistor, Q301 in the opposite half cycle. In opposite half cycle, the collector-base junction of Q300 becomes forward biased and can source sufficient bias current to operate the associated transistor, Q301. The parallel diode, D300A works by limiting the collector voltage to only one forward diode drop, therefore limiting base drive voltage for associated transistor, Q301 to approx. zero volts.

Figure 3:
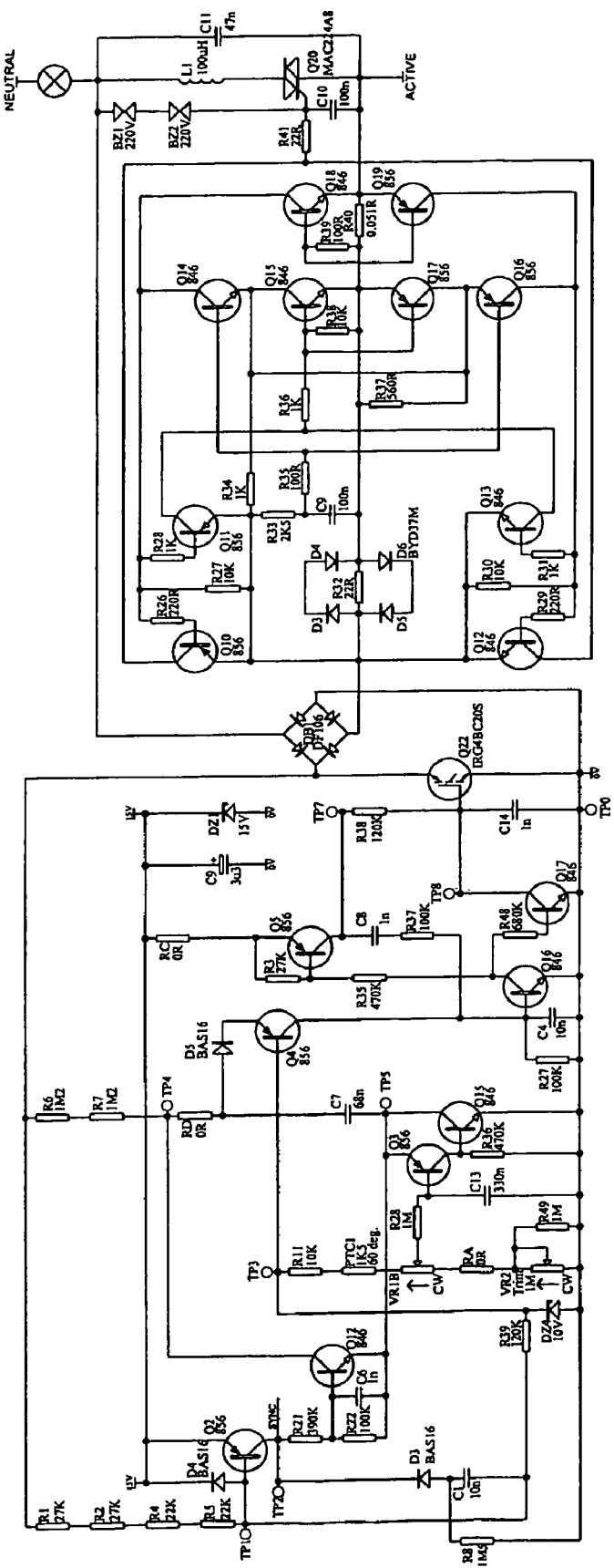
FIG. 3 shows a current switch control circuit which may be used as an alternative to the voltage switch control circuit of FIGS. 1 and 2.

The above voltage driven triac control circuit may equally be replaced by a current driven triac control circuit as shown in FIG. 3. Once again, the primary function of this circuit is to trigger the triac once the IGBT has completed the slow-switching EMC emission reduction operation, on a per half-cycle basis. The circuit is essentially symmetrical and is used to provide a triac gate drive pulse in quadrants 1 and 3 (gate drive polarity follows mains polarity).

In operation, a current sense resistor, R32, is used to derive drive potential for the entire triac drive circuit. After a defined load current threshold is achieved, sufficient for triac gate requirements, excess current is by-passed by series connecting diodes D3 and D4. The developed sense voltage begins charging a time delay network made up of resistor R33 and capacitor C9. A comparator transistor, Q14, is driven via resistor R35 once the timing circuit output voltage reaches a threshold level. This level is determined by the voltage at the junction of voltage divider resistors R34 and R37 (sourced by the initial sense voltage), in addition to the base-emitter junction voltage of transistor Q14.

The operation of transistor Q14 results in simultaneous application of base drive for transistors Q10 and Q11, via respective base current limiting resistors R26 and R28. Transistor Q11, referenced to the sense voltage, proceeds to drive transistor Q15 via resistor R36. Operation of transistor Q15 reduces the comparative threshold voltage by lowering transistor Q14 emitter potential. This positive feedback process is regenerative to speed up the switching action. The application of the triac gate drive current is via output transistor Q10 and current limiting resistor R41. Resistors R27 and R38 are required to prevent possible adverse effects from leakage and transistors Q10, Q11 and Q15.

The operation of the circuit for the negative mains half cycle is the same as described above, using the mirrored set of components.

During IGBT over-current conditions, sufficient voltage is developed across current sense resistor R40 to bias on transistor Q18. This in turn provides base current drive for upward transistor Q10, immediately operating the triac, to divert current away from the IGBT circuit. Resistor R39 limits transistor Q18 base current drive to a safe level under these conditions. This provides an inbuilt circuit protection mechanism.

At dimmer over-voltage currents, the triac gate is directly driven by series connector tranzorbs BZ1 and BZ2. Capacitor C10 is placed across the triac gate-MT1 terminals in order to enhance the triac immunity to dv/dt triggering from mains transients.

Inductor L1 limits the rate of transfer of load current from the IGBT circuit to the triac on order to control line conducted EMI emission levels. The amount of inductance required for this function is related to the difference between the triac on-state voltage and the voltage across the IGBT circuit current above just prior to triac operation. The presence of current sense resistor R32 in the IGBT circuit current path introduces additional voltage differential, there by influencing the amount of inductance required. An additional means of controlling line conducted EMI emission levels is via shunt capacitor C11 which works in conjunction with L1 to form a second order low-pass-filter.

A particular advantage of the present circuit is the ability of the triac control circuit (whether it would be voltage driven or current driven) to be controlled directly by the IGBT circuit rather than via a third centralized control block as in prior systems.

In the case of the voltage driven drive circuit, this essentially monitors the diode bridge voltage, under control of the operational IGBT in order to determine when triac firing should occur. The necessary charge required for triac gate drive is accumulated from the available mains voltage in the period of the half-cycle before commencement of IGBT conduction. The triac is essentially fired when the diode bridge voltage is reduced below a minimum set threshold. This minimum set threshold is determined by zener diodes DZ2 and DZ3 which in the present example, said a minimum threshold of 20 volts (for the positive and negative cycles). The voltage at the diode bridge is sensed by transistor Q6 and resistor network R17, R16, R18 and R19 as would be understood by the person skilled in the art. The minimum voltage threshold is determined by the components used (in this case the zener diodes DZ2 and DZ3) and is generally set to exceed by a suitable margin the conduction voltage for the IGBT circuit.

In the case of the current driven drive circuit, this essentially monitors the diode bridge current under control of the operational IGBT, in order to determine when triac firing should occur. The necessary current required for triac gate drive is derived from the load current resulting at IGBT conduction in the half cycle. Again, the triac is fired when the diode bridge current above a minimum threshold which in this case, is set by resistor R32.

In this way, the circuit configuration is far simpler than prior art designs which require a separate centralised control block monitoring electrical parameters of the IGBT circuit, determining when the triac should be fired in relation to those sensed parameters and providing control signals to the triac control circuit. Alternatively, the centralised control block sometimes provides control signals to both the IGBT and triac control circuits independently of each other, based on pre-set timing parameters.

Figure 4:
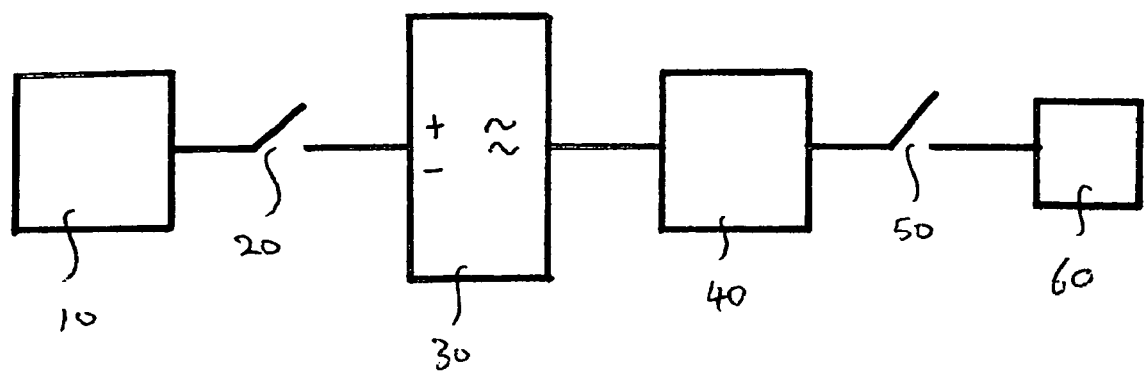
FIG. 4 shows a simplified block diagram of the circuit of FIG. 1.

A simplified block diagram of this circuit arrangement is shown in FIG. 4, in which element 10 represents the first control circuit (IGBT control), element 20 represents a first switch (IGBT), element 30 represents the rectifying circuit (eg. Diode bridge), and element 40 represents the second control circuit (triac control), which obtains its control signals from first control circuit 10, via rectifying circuit 30. Element 50 represents the second switch (triac), which is controlled by second control circuit, and element 60 represents the load.

In practice, the voltage driven triac driven control circuit is preferred over the current driven triac drive circuit. However, each has advantages and disadvantages. The voltage driven triac drive circuit allows minimal size of EMC filter components which results in highest overall product efficiency. The voltage driven circuit however requires voltage dropping elements to derive a power source from the mains, therefore introducing local power dissipation problems (only at low conduction angle settings, where total overall dissipation is low). Further more, additional components are required to disable the triac drive when no IGBT drive is present to achieve off-state conditions (only required for applications without series manually-operated switch).

In contrast, the current driven circuit does not require a power source connection to the mains, and therefore no local power dissipation issues are encountered. Further more, the triac drive is one hundred percent disabled when there is no IGBT drive to achieve the of state (this is an advantage only for application without a series manually-operated switch). The current drive circuit however suffers from the disadvantage that the presents of current sense components necessitates larger EMC filter components, and lower overall efficiency is achievable.

Another circuit block provides circuit protection from over current conditions which may arise from IGBT operation. During such conditions, sufficient voltage is developed across current sense resistor R42 to bias on transistor Q14. This in turn provides base current drive for output transistor Q1, immediately operating the triac, to divert current away from the IGBT circuit on the DC side of the diode bridge. Resistor R40 limits transistor Q14 base current drive to a safe level under these conditions.

At dimmer over-voltage occurrences the triac gate is directly driven via series connected tranzorbs D1 and D2 and current limiting resistor R20. Capacitor C11 is placed across the triac gate MT1 terminals in order to enhance the triac immunity to dv/dt triggering from mains transients.

In this dimmer design topology, it is not necessary to incorporate an inductor to achieve the required RF emission level limits. A relatively small inductor may however by required to provide some degree of di/dt protection for the triac during IGBT over current conditions. In normal operation, the voltage appearing across the triac just prior to firing is of the order of a few volts, depending on the actual load current magnitude. This voltage is a function of the IGBT saturation voltage and diode bridge forward voltage characteristics. At such low operating voltage levels, the triac switching action is more gradual than in standard high voltage triac applications. This results in an inherent smooth transfer of current from IGBT to the triac, with low associated RF emission levels. The addition of the inductor L1 however, slightly increases the RF emission component associated with transfer of current from the IGBT to the triac. This corresponds to the small introduced current wave form discontinuity at the point when the IGBT current drops to zero.

Additionally, at the end of each mains half cycle where the triac naturally commutates off, a burst of RF emission occurs, due to the discontinuity in the load current wave form. Attenuation of this emission is achieved by a capacitor C15 place across the dimmer terminals. An important additional role of this capacitor is in improving the entire dimmer circuit immunity to EFT.

Another circuit block is an inductive load imbalance detector. The function of the circuit block is to shut down dimmer control in the case of excessively asymmetrical operation, which may be the result of connection to an unloaded iron-core LV lighting transformer. Dimming operation is suspended if the average voltage across the dimmer terminals for the positive and negative half cycles are not similar.

Referring back to FIG. 1, two resistor divider chains made up of resistors R43, R44, R29 and R45, R46 and R30 are used to sense the mains voltages appearing at the active and load terminals respectively. When referenced to the bridge common (negative) terminal, these voltages represent opposite polarities of the mains voltage across the dimmer. The divider junction of each chain is connected to opposite sides of capacitor C12, to produce a differential voltage proportional to the difference in half cycle voltages. Two transistors, Q9 and Q10 are used to produce a common-referenced signal if the differential voltage exceeds a threshold of approximately 0.6 volts. A latch circuit made up of transistors Q11 and Q20 and resistors R32 and R34 has input driven by the imbalance detector output. A transistor Q21, wired as a low leakage diode, directs latch output from transistor Q11 collector to "sync", ie. to drive the timing control bypass transistor Q12.

Transistor Q21 acts as a blocking diode to prevent any latch operation by the zero crossing detector. Base-emitter bypass resistors R31 and R33 are required to minimise leakage in the respective transistors. Similarly, capacitors C5 and C16 are present to enhance EFT immunity of the latch circuit. In addition, capacitor C5 provides rejection for any high frequency signal component from the imbalanced detector output.

When operating inductive loads, the dimmer circuit incorporates a moderately sensitive triac assist in achieving an acceptable level of performance, particularly in terms of operating symmetry with worst case load types, ie. low value VA, highly inductive loads such as exhaust fan motors.

In normal dimming operation, the IGBT initially operates followed by firing of the triac after a fixed time delay. During this pre-triac conduction delay time period, the inductive load current has an opportunity to develop in magnitude. This delay time therefore also increases the ability of the triac to operate successfully with such difficult loads.

At very low conduction angle settings however, there may be insufficient load current available for reliable triac latching. In this case, a low level load DC component will be sustained by the dimmer in combination with the non-linear load inductance. Under these conditions, there is no danger of damage to the load due to the relatively low rms current magnitude. If load DC component levels become excessive operation of the imbalance detector will automatically shut down the dimmer control.

In general, capacitive input electronic LV transformers are not generally suitable for leading edge phase control dimmers owing to the additional resulting dimmer power dissipation. The high capacitor charging current pulses increase line conducted EMC emission levels and may produce repetitive high frequency ringing bursts on the mains voltage waveform.

The dimmer circuit of FIG. 1 incorporates load-over current sensing applicable during the IGBT conduction period. Dimmer connection to such capacitive loads result in sustained operation of the over-current mechanism, producing even higher EMC emission levels. In addition, the high frequency and amplitude ringing current waveform which typically present for the first few hundred micro seconds may result in commutation of the triac. If this condition prevails, the imbalanced protector may cause the dimmer control to shut down. For electronic transformers with maximum rated load connected, this condition is far less likely to occur.

Figure 5:
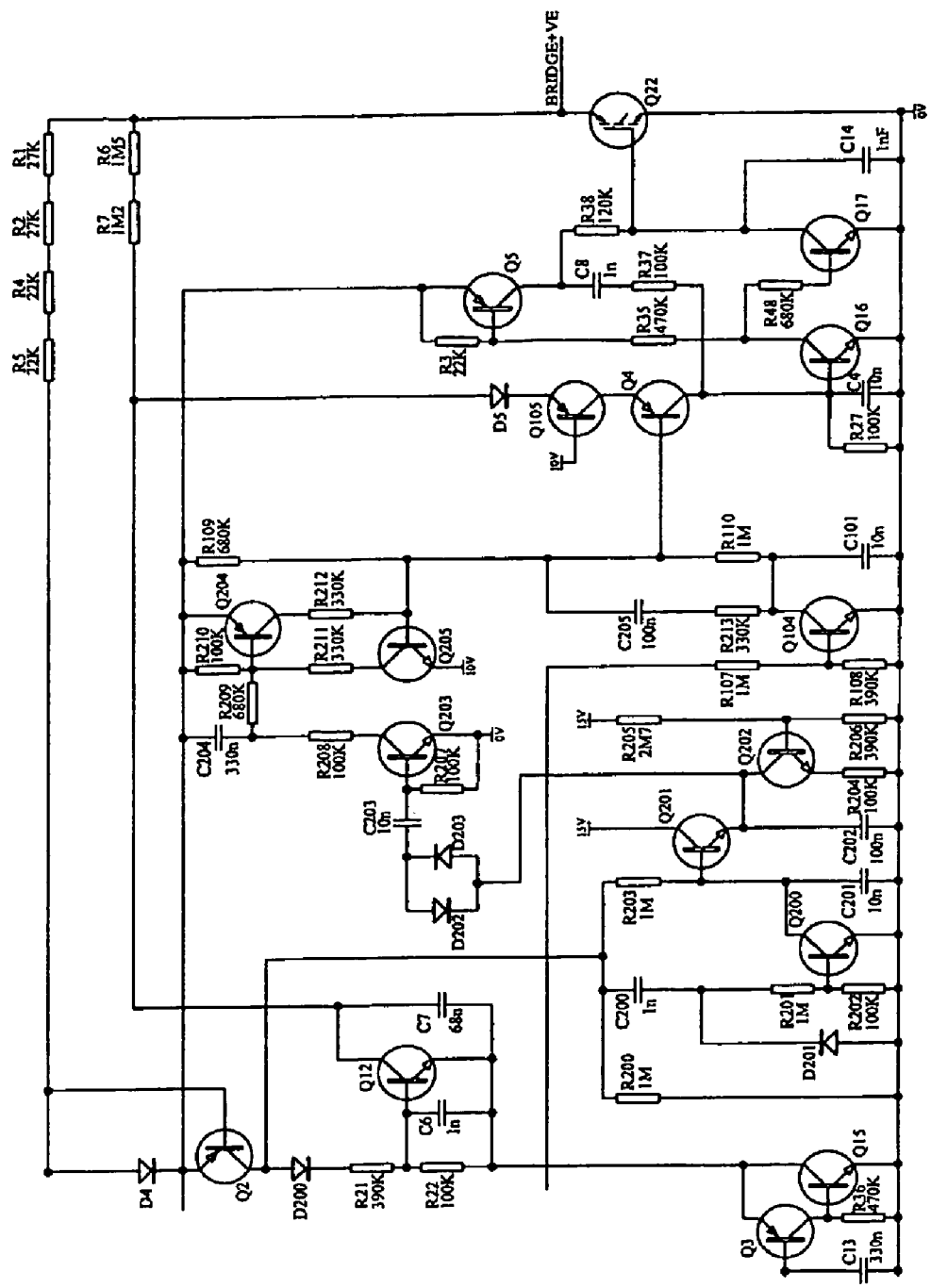
FIG. 5 shows an alternative arrangement for the impedance load imbalance detector portion of FIG. 1.

An alternative circuit configuration for the inductive load imbalance detector of FIG. 1 as described above is now described with reference to FIG. 5, which shows an alternative circuit arrangement for the IGBT control of FIG. 1.

The general operation of the imbalance detection process is described as follows. A capacitor, used to represent conduction time, is repetitively charged from zero to a level determined by the prevailing half cycle conduction period. The voltage developed on this "conduction time detection" capacitor is used to set the peak voltage on a second capacitor, to represent peak conduction time. This "peak conduction time" capacitor is simultaneously discharged with a constant dc current sink. The resulting "peak conduction time" capacitor voltage waveform comprises two components. (1) A dc component exists with magnitude proportional to half cycle conduction period. (2) An AC component exists in the form of a sawtooth, with magnitude determined by fixed parameters ie. capacitor value, magnitude of dc current sink and repetition frequency (2×mains freq.).

If sufficient difference in alternate polarity half cycle conduction periods exist, the resulting AC voltage waveform associated with the "peak conduction time" capacitor has double the normal amplitude, at only half the repetition frequency (mains freq.). A simple amplitude threshold detector, with dc blocking properties, is used to activate a latching circuit in order to disable dimmer operation when the condition is detected as a steady state.

A more detailed description with reference to actual components involved follows: During load conduction period of dimming cycle, transistor Q2 collector can source current via limiting resistor R203 to "conduction time detection" capacitor C201. When dimmer reverts to the non-conducting state, at the end of each half cycle, diode D200 isolates any current associated with charging of main timing capacitor C7.

Transistor Q200 is used to reset C201 to zero volts at the start of each half cycle conduction period. Associated pulsed base drive for Q200 is provided by capacitor C200 in series with resistor R201. Diode D201 in conjunction with resistor R200 provides the necessary discharge path for C200 in preparation for next mains half cycle event. Resistor R202 bypasses base-emitter of Q200 to reduce device off-state leakage, during charging period of C201.

Transistor Q201 is configured as an emitter follower, so that the voltage across capacitor C202 must follow the peak voltage of C201, during brief period where Q201 base-emitter input is forward biased. Transistor Q202 in conjunction with bias resistors R204, R205 & R206 is configured as a current sink for C202.

The sawtooth voltage waveform across C202 is AC coupled to the base of "threshold detection" transistor Q203 via diodes D202/D203 and capacitor C203. Series connected diode D203 functions to provide enough signal voltage drop so that Q203 is not driven under symmetrical dimmer operating conditions, where input signal amplitude is normally low. Resistor R207 reduces Q203 device off-state leakage, in addition to providing a reverse charge path for C203. Diode D202 also forms part of the reverse charge path for C203.

Under asymmetric dimmer operating conditions, Q203 is operated in pulse mode, at a low duty cycle. An RC network comprising R208 and C204 is used to provide an averaging function for the resulting pulse train. Transistor Q204 forms part of a latch circuit, which is triggered when the voltage across C204 reaches a critical level—as defined by voltage divider resistors R209 & R210 in conjunction with Q204 base-emitter threshold potential. Transistor Q205 in conjunction with resistors R211 & R212 forms the remaining part of the latching circuit.

At mains power-up or at initial activation of PWM dimmer control drive, it is necessary to ensure that the latching circuit is cleared to the unlatched state for a number of complete mains cycles. This function is performed by RC network comprising R213 and C205, which initially holds the base drive voltage for Q205 at a level less than the emitter reference level.

It will be appreciated that the above has been described with reference to a preferred embodiment and that many variations and modifications are possible as would be understood by the person skilled in the art.

The claims defining the invention are as follows:

1. A dimmer circuit for controlling delivery of power to a load, the dimmer circuit including;
    a first control circuit for controlling a first switch for controlling a rate of rise of voltage across the load; and
    a second control circuit for controlling a second switch; wherein said second control circuit is controlled by said first control circuit.

2. A dimmer circuit according to claim 1 wherein said first switch and said second switch are separated by a rectifying circuit.

3. A dimmer circuit according to claim 2 wherein said second control circuit is controlled by said first control circuit via said rectifying circuit.

4. A dimmer circuit according to claim 3 wherein said second control circuit obtains control signals from said first control circuit by sensing a voltage across said rectifying circuit.

5. A dimmer circuit according to claim 4 wherein said second circuit is actuated upon sensing that said voltage falls below a pre-set voltage threshold.

6. A dimmer circuit according to claim 5 wherein said pre-set voltage threshold is determined by a zener diode.

7. A dimmer circuit according to claim 5 wherein said pre-set voltage threshold is set to exceed a conduction voltage level of said first switch.

8. A dimmer circuit according to claim 3 wherein said second control circuit obtains control signals from said first control circuit by sensing a current through said rectifying circuit.

9. A dimmer circuit according to claim 8 wherein said second circuit is actuated upon sensing that said current rises above a pre-set current threshold.

10. A dimmer circuit according to claim 1 wherein said first switch is an IGBT power semiconductor.

11. A dimmer circuit according to claim 1 wherein said second switch is a triac.

12. A dimmer circuit according to claim 1 wherein said second control circuit controls said second switch to control the load current provided to the load.

13. A dimmer circuit according to claim 1 wherein the dimmer circuit is a leading edge phase control dimmer circuit.

* * * * *